United States Patent
de la Iglesia

(10) Patent No.: US 8,972,689 B1
(45) Date of Patent: Mar. 3, 2015

(54) APPARATUS, METHOD AND SYSTEM FOR USING REAL-TIME PERFORMANCE FEEDBACK FOR MODELING AND IMPROVING ACCESS TO SOLID STATE MEDIA

(75) Inventor: Erik de la Iglesia, Sunnyvale, CA (US)

(73) Assignee: Violin Memory, Inc., Santa Clara, CA (US)

( * ) Notice: Subject to any disclaimer, the term of this patent is extended or adjusted under 35 U.S.C. 154(b) by 976 days.

(21) Appl. No.: 13/019,617

(22) Filed: Feb. 2, 2011

(51) Int. Cl.
*G06F 13/00* (2006.01)
*G06F 3/06* (2006.01)
*G06F 12/08* (2006.01)
*G06F 12/10* (2006.01)

(52) U.S. Cl.
CPC .......... *G06F 3/0628* (2013.01); *G06F 12/0844* (2013.01); *G06F 3/0631* (2013.01); *G06F 12/1054* (2013.01); *G06F 12/0842* (2013.01)
USPC ................ 711/168; 711/149; 710/7; 710/20; 710/310; 712/9; 712/206

(58) Field of Classification Search
CPC . G06F 3/0628; G06F 3/0631; G06F 12/0842; G06F 12/0844; G06F 12/1054
USPC ............. 711/149, 168; 710/7, 20, 310; 712/9, 712/206
See application file for complete search history.

(56) References Cited

U.S. PATENT DOCUMENTS

| | | | |
|---|---|---|---|
| 5,861,893 A * | 1/1999 | Sturgess | 345/562 |
| 5,954,796 A | 9/1999 | McCarthy et al. | |
| 6,041,366 A | 3/2000 | Maddalozzo et al. | |
| 6,401,147 B1 | 6/2002 | Sang et al. | |
| 6,636,982 B1 | 10/2003 | Rowlands | |
| 6,678,795 B1 | 1/2004 | Moreno et al. | |
| 6,721,870 B1 | 4/2004 | Yochai et al. | |
| 6,742,084 B1 | 5/2004 | Defouw et al. | |
| 6,789,171 B2 | 9/2004 | Desai et al. | |
| 6,810,470 B1 | 10/2004 | Wiseman et al. | |
| 7,017,084 B2 | 3/2006 | Ng et al. | |
| 7,089,370 B2 | 8/2006 | Luick | |
| 7,110,359 B1 | 9/2006 | Acharya | |
| 7,606,944 B2 * | 10/2009 | Kalwitz et al. | 710/5 |
| 7,856,533 B2 | 12/2010 | Hur et al. | |
| 7,870,351 B2 | 1/2011 | Resnick | |
| 7,873,619 B1 | 1/2011 | Faibish et al. | |
| 7,975,108 B1 | 7/2011 | Holscher et al. | |
| 8,010,485 B1 | 8/2011 | Chatterjee et al. | |
| 2002/0035655 A1 | 3/2002 | Finn et al. | |
| 2002/0175998 A1 | 11/2002 | Hoang | |
| 2002/0194434 A1 | 12/2002 | Kurasugi | |
| 2003/0012204 A1 | 1/2003 | Czeiger et al. | |

(Continued)

OTHER PUBLICATIONS

Stolowitz Ford Cowger Listing of Related Cases, Feb. 7, 2012.

(Continued)

*Primary Examiner* — Reba I Elmore
(74) *Attorney, Agent, or Firm* — Brinks Gilson & Lione

(57) ABSTRACT

A storage processor identifies latency of memory drives for different numbers of concurrent storage operations. The identified latency is used to identify debt limits for the number of concurrent storage operations issued to the memory drives. The storage processor may issue additional storage operations to the memory devices when the number of storage operations is within the debt limit. Storage operations may be deferred when the number of storage operations is outside the debt limit.

21 Claims, 10 Drawing Sheets

(56) References Cited

U.S. PATENT DOCUMENTS

| | | |
|---|---|---|
| 2003/0167327 A1 | 9/2003 | Baldwin et al. |
| 2003/0177168 A1 | 9/2003 | Heitman et al. |
| 2003/0210248 A1 | 11/2003 | Wyatt |
| 2004/0128363 A1 | 7/2004 | Yamagami et al. |
| 2004/0146046 A1 | 7/2004 | Jo et al. |
| 2004/0186945 A1 | 9/2004 | Jeter et al. |
| 2004/0215923 A1 | 10/2004 | Royer |
| 2005/0025075 A1 | 2/2005 | Dutt et al. |
| 2005/0195736 A1 | 9/2005 | Matsuda |
| 2006/0005074 A1 | 1/2006 | Yanai et al. |
| 2006/0034302 A1 | 2/2006 | Peterson |
| 2006/0053263 A1 | 3/2006 | Prahlad et al. |
| 2006/0075191 A1 | 4/2006 | Lolayekar et al. |
| 2006/0112232 A1 | 5/2006 | Zohar et al. |
| 2006/0212524 A1 | 9/2006 | Wu et al. |
| 2006/0218389 A1 | 9/2006 | Li et al. |
| 2006/0277329 A1 | 12/2006 | Paulson et al. |
| 2007/0050548 A1 | 3/2007 | Bali et al. |
| 2007/0079105 A1 | 4/2007 | Thompson |
| 2007/0118710 A1 | 5/2007 | Yamakawa et al. |
| 2007/0124407 A1 | 5/2007 | Weber et al. |
| 2007/0192444 A1 | 8/2007 | Ackaouy et al. |
| 2007/0233700 A1 | 10/2007 | Tomonaga |
| 2007/0283086 A1 | 12/2007 | Bates |
| 2008/0028162 A1 | 1/2008 | Thompson |
| 2008/0098173 A1 | 4/2008 | Chidambaran et al. |
| 2008/0104363 A1 | 5/2008 | Raj et al. |
| 2008/0162864 A1 | 7/2008 | Sugumar et al. |
| 2008/0215827 A1 | 9/2008 | Pepper |
| 2008/0215834 A1 | 9/2008 | Dumitru et al. |
| 2008/0250195 A1 | 10/2008 | Chow et al. |
| 2008/0320269 A1 | 12/2008 | Houlihan et al. |
| 2009/0006725 A1 | 1/2009 | Ito et al. |
| 2009/0006745 A1 | 1/2009 | Cavallo et al. |
| 2009/0034377 A1 | 2/2009 | English et al. |
| 2009/0110000 A1 | 4/2009 | Brorup |
| 2009/0119481 A1* | 5/2009 | Vishkin ............... 712/29 |
| 2009/0150576 A1* | 6/2009 | Madruga et al. ............ 710/28 |
| 2009/0157994 A1* | 6/2009 | Hampel et al. ............ 711/168 |
| 2009/0240873 A1 | 9/2009 | Yu et al. |
| 2009/0259800 A1 | 10/2009 | Kilzer et al. |
| 2009/0262741 A1 | 10/2009 | Jungck et al. |
| 2009/0276588 A1 | 11/2009 | Murase |
| 2009/0307388 A1 | 12/2009 | Tchapda |
| 2010/0011154 A1 | 1/2010 | Yeh |
| 2010/0030809 A1 | 2/2010 | Nath |
| 2010/0080237 A1 | 4/2010 | Dai et al. |
| 2010/0088469 A1 | 4/2010 | Motonaga et al. |
| 2010/0115206 A1 | 5/2010 | de la Iglesia et al. |
| 2010/0115211 A1 | 5/2010 | de la Iglesia et al. |
| 2010/0122020 A1 | 5/2010 | Sikdar et al. |
| 2010/0125857 A1 | 5/2010 | Dommeti et al. |
| 2010/0169544 A1 | 7/2010 | Eom et al. |
| 2010/0174939 A1 | 7/2010 | Vexler |
| 2011/0047347 A1 | 2/2011 | Li et al. |
| 2011/0258362 A1 | 10/2011 | McLaren et al. |
| 2012/0198176 A1 | 8/2012 | Hooker et al. |

OTHER PUBLICATIONS

Roseblum, Mendel and Ousterhout, John K., The LFS Storage Manager, Proceedings of the 1990 Summer Usenix. 1990 pp. 315-324.

Mark Friedman, Odysseas Pentakalos. Windows 2000 Performance Guide. File Cache Performance and Tuning [reprinted online]. O'Reilly Media. Jan. 2002 [retrieved on Oct. 29, 2012]. Retrieved from the internet: <URL:http://technet.microsoft.com/en-us/library/bb742613.aspx#mainSection>.

* cited by examiner

| NUMBER OF WORKING THREADS | TIME TO EXECUTE 1M RANDOM READs | TOTAL WAIT TIME FOR ALL THREADS | AVERAGE READ LATENCY |
|---|---|---|---|
| 1 | 100s | 100s | 100us |
| 2 | 65s | 150s | 150us |
| 3 | 50s | 200s | 200us |
| 4 | 40s | 250s | 250us |
| 5 | 35s | 333s | 333us |
| 6 | 30s | 416s | 416us |
| 7 | 30s | 500s | 500us |
| 8 | 30s | 800s | 800us |
| 9 | 30s | 1100s | 1100us |

APPARATUS, METHOD AND SYSTEM FOR USING REAL-TIME PERFORMANCE FEEDBACK FOR MODELING AND IMPROVING ACCESS TO SOLID STATE MEDIA

BACKGROUND

A computer system may store data on different types of memory devices. For example, data may be stored on rotating disk drives and data may be stored on solid state drives (SSDs). The rotating disk drives have a mechanical head that physically contacts different locations on the rotating disk to read or write data. Since there is typically only one head, the rotating disk drive can only access data serially at one location on the physical disk at a time.

The SSD drive may access multiple different storage locations at the same time. For example, the SSD drive may include multiple solid state memory devices that can each independently read and write data. The SSD drive may service multiple storage access requests in parallel by accessing data from the different memory devices.

The computer system may create a backlog of storage access requests to utilize more SSD drive capacity. For example, the computer system may queue multiple read requests to the SSD drive at or near the same time. The SSD drive can service more read requests and operate at a higher capacity since less time is wasted waiting for new read requests from the computer system.

DETAILED DESCRIPTION

Figure 1:
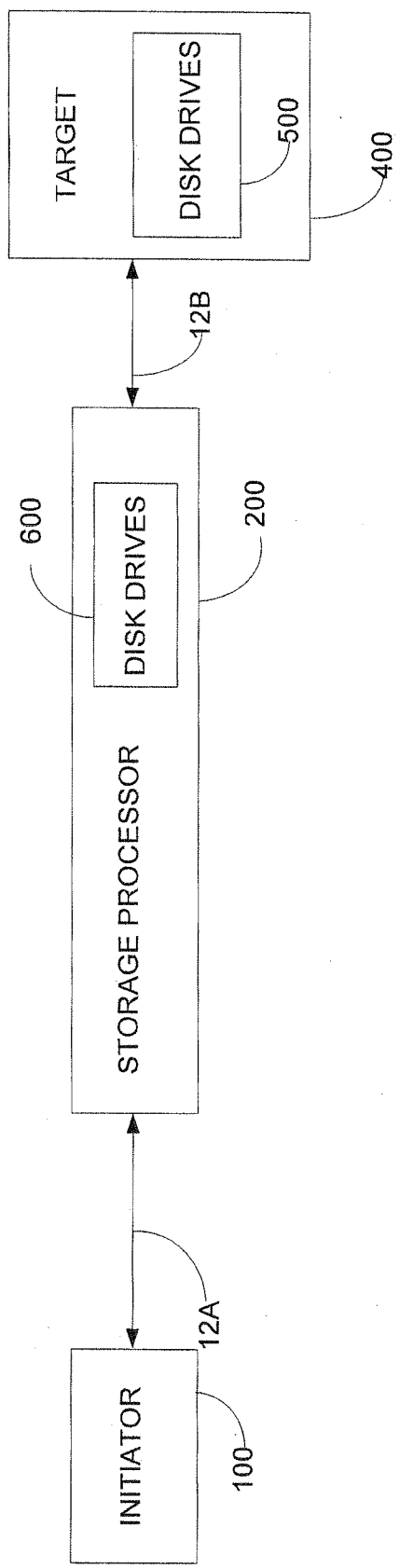
FIG. 1 depicts an example of a storage processor.

FIG. 1 shows a storage processor 200 deployed between an initiator 100 and a target 400. The initiator 100, storage processor 200, and/or target 400 may be directly connected together, or connected to each other through a network or fabric. Only one initiator 100 and one target 400 are shown in FIG. 1 for explanation purposes. However, it should be understood that multiple initiators 100 and multiple targets 400 may be connected to storage processor 200. Such multiple connections may be direct, routed or switched depending on the physical interface type and transport protocol.

The initiator 100 may be any device or application that writes and/or reads data to and from another device. For example, the initiator 100 may comprise one or more servers, server applications, database applications, routers, switches, client computers, personal computers, Personal Digital Assistants (PDA), smart phones, or any other wired or wireless computing device and/or software that accesses data in target 400.

In another example, the initiator 100 may comprise a stand-alone appliance, device, or blade, and the target 400 may comprise a stand-alone storage array of disk drives 500. In yet another example, the initiator 100 may be a processor or software application in a computer that accesses target 400 over an internal or external data bus.

Target 400 may be any device that stores data accessed by another device, application, software, initiator, or the like, or any combination thereof. Target 400 may be located in a personal computer or server, or may be a stand-alone device coupled to the initiator 100 via a computer bus or packet switched network connection.

In one example, the target 400 may comprise storage devices or storage servers that contain storage media such as solid state memory, rotating disk drives, solid state drives (SSD) or the like, or any combination thereof. For example, target 400 may contain multiple disk drives 500 that may exist locally within the same physical enclosure as storage processor 200, within a same enclosure with other target 400, or exist externally in a chassis connected to target 400 and/or storage processor 200 through an interconnect mechanism.

In one example, the initiator 100, storage processor 200, and/or target 400 are coupled to each other via wired or wireless connections 12A and 12B. Different communication protocols can be used over connection 12A between initiator 100 and storage processor 200 and connection 12B between storage processor 200 and target 400. Typical protocols include Fibre Channel Protocol (FCP), Small Computer System Interface (SCSI), Advanced Technology Attachment (ATA) and encapsulated protocols such as Fibre Channel over Ethernet (FCoE), Internet Small Computer System Interface (ISCSI), Fibre Channel over Internet Protocol (FCIP), ATA over Ethernet (AoE), or the like, or any combination thereof.

Storage processor 200 may be any combination of hardware and/or software located in a storage appliance, wireless or wired router, server, gateway, firewall, switch, computer processing system, or the like, or any combination thereof. The initiator 100 may issue storage commands to the disk drives 500 in target 400 though the storage processor 200. The storage commands may include write commands and read commands that have associated storage addresses. The storage commands may be normalized by the storage processor 200 into block-level commands such as "reads" and "writes" of an arbitrary number of blocks.

Storage processor 200 may include disk drives 600 configured to accelerate accesses associated with target 400. For example, the disk drives 600 may be used as a cache and/or tiering media for storing copies of data contained in disk drives 500. However, disk drives 600 may be used for any operation where storage processor 200 may want to access an internal memory media.

Examples of how disk drives 600 may be used as a cache and/or tiering media are described in the following co-pending patent applications which are all herein incorporated by reference in their entirety: U.S. patent application Ser. No. 12/889,732 filed on Sep. 24, 2010; U.S. patent application Ser. No. 12/814,438 filed on Jun. 12, 2010; U.S. patent application Ser. No. 12/605,119 filed on Oct. 23, 2009; U.S. patent application Ser. No. 12/605,160 filed Oct. 23, 2009; and U.S. patent application Ser. No. 12/684,387 filed Jan. 8, 2010 which are all herein incorporated by reference in their entirety.

Figure 2:
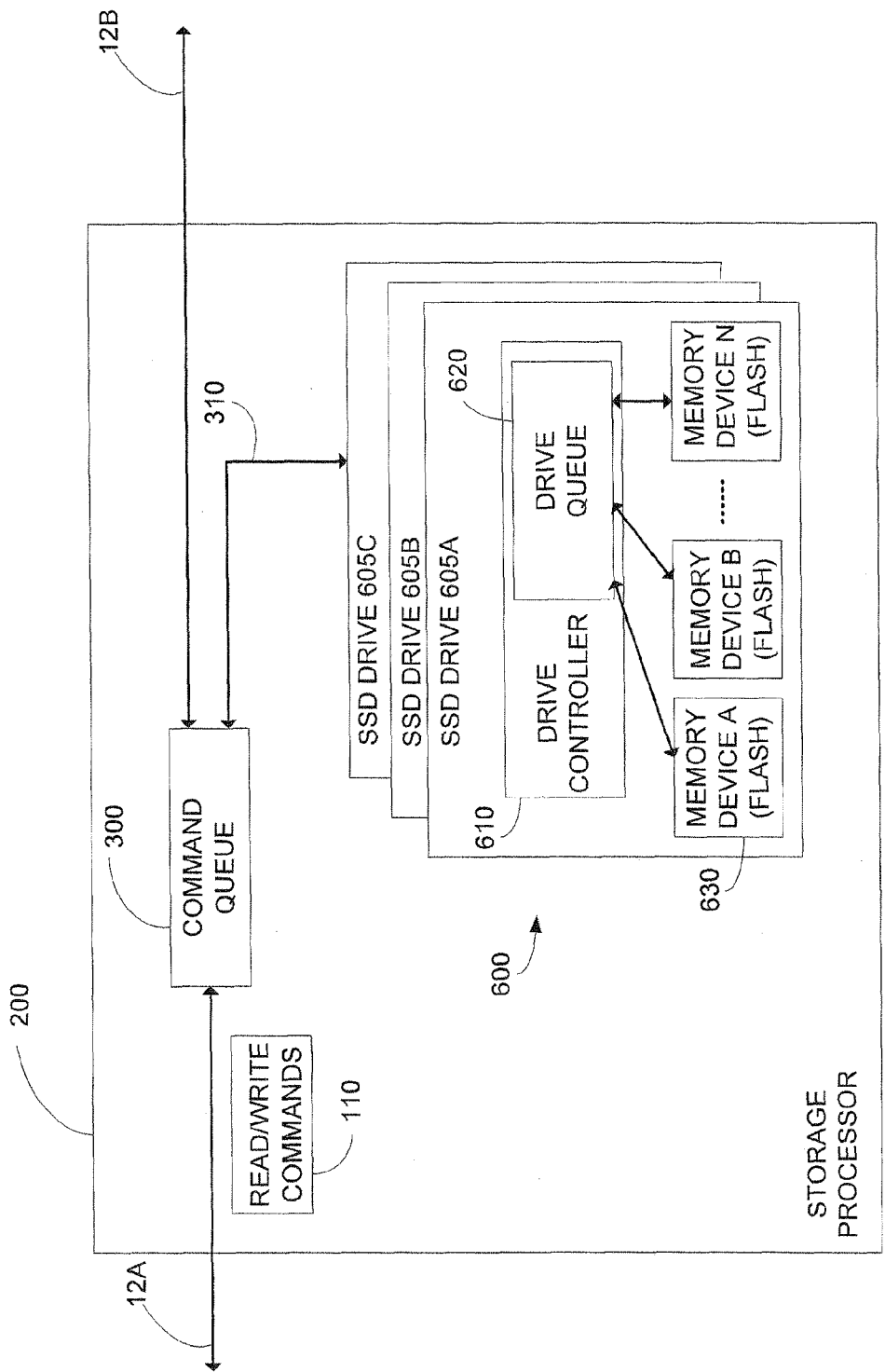
FIG. 2 depicts an example of the storage processor of FIG. 1 in more detail.

FIG. 2 depicts an example of the storage processor 200 of FIG. 1 in more detail. A command queue 300 receives storage access commands 110 sent from initiator 100 and directed to target 400. For example, the storage access commands 110 may comprise read or write commands. In one example, the disk drives 600 may comprise multiple solid state drives (SSD) 605A-605C each including multiple simultaneously accessible memory devices 630. In one example, memory devices 630 may comprise Flash memory, but other types of memory, such random access memory (RAM) or other solid state memory may also be used. In one example, other rotating storage media may be used in disk drives 600 in combination with SSD drives 605.

In one example, the disk drives 605 include a drive controller 610 that uses a drive queue 620 to manage the dispatch and ordering of storage commands 110 received from storage processor 200. In one example, the drive controller 610 may be implemented using an application specific integrated circuit (ASIC), however, other types of logic circuitry may also be used.

Drive controller 610 may access the different memory devices 630 for different storage commands 110. For example, drive controller 610 may stripe data over different combinations of memory devices 630 based on the amount of data associated with the storage commands 110. As a result, data associated with a first storage command 110 may be stored over multiple memory devices A-C, data associated with a second storage command 110 may only be stored in memory device A, and data associated with a third storage command 110 may be stored in memory device B.

The disk drives 500 in target 400 may have a similar structure as the disks drives 600 shown in FIG. 2. For example, the disk drives 500 may include multiple SSD drives 605 each having multiple concurrently accessible memory devices 630. For explanation purposes, the SSD drives 605 may be shown and described below as located in storage processor 200 as part of disk drives 600. However, any operations described below may apply either to the SSD drives 605 in disk drives 500 of target 400 and/or the SSD drives 605 in disk drives 600 of storage processor 200.

Command queue 300 may be associated with the disk drives 500 in target 400, the disk drives 600 in storage processor 200, or may include one set of command queues for disk drives 500 and a second set of command queues for disk drives 600.

Storage processor 200 may receive a storage command 110 in command queue 300 from initiator 100. Storage processor 200 may send the storage command 110 over connection 310 to disk drives 600 when the address associated with the storage command 110 contains an address for data contained in disk drives 600. When the address does not match an address associated with data in disk drives 600, storage processor 200 may forward the storage command 110 in command queue 300 over connection 12B to disk drives 500.

Storage processor 200 manages the queuing of storage commands 110 from command queue 300 to improve overall performance of disk drives 500 and/or disk drives 600. In one example, the storage processor 200 may determine the read latencies for the different SSD drives 605 for different numbers of concurrent storage commands 110. Concurrent storage commands refer to multiple storage commands 110 sent, serviced, and/or queued in a same one of the SSD drives 605 at the same time. Storage processor 200 controls the number of concurrent storage commands 110 queued in the SSD drives 605 in a manner that maintains high utilization without unnecessarily increasing storage access latency.

In one example, the storage processor 200 may receive a read command 110 directed to a particular SSD drive 605 in disk drives 600 or disk drives 500. Storage processor 200 may determine how many storage access commands 110 are currently queued in the associated SSD drive 605. Based on the queue backlog and the predicted performance characteristics of the SSD drive 605, storage processor 200 may immediately forward the read command 110 to the SSD drive 605 or may defer sending the read command 110 to the SSD drive.

For example, the SSD drive 605 may currently be operating at a relatively high capacity and an additional read command 110 may be predicted to experience an exceptionally long read latency. The storage processor 200 may defer dispatching the read command 110 from command queue 300 to the SSD drive 605. Deferring the dispatch, may maintain low storage access latency and prevent the read command 110 from blocking other read commands.

Figure 3:
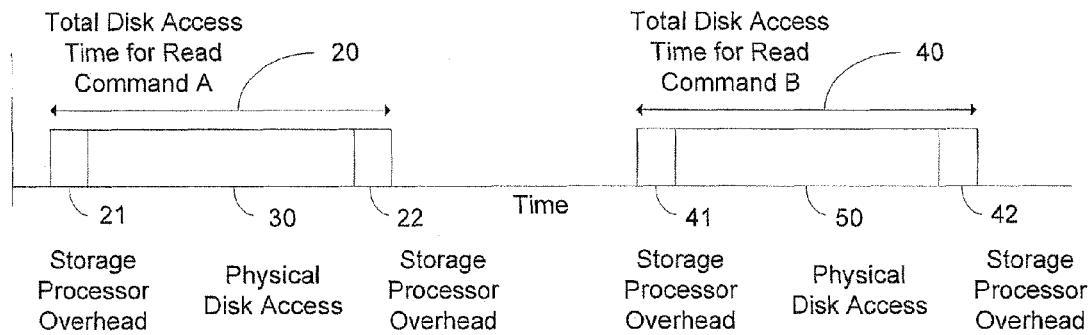
FIG. 3 depicts an example of serial read commands to a disk drive.

FIG. 3 depicts an example timeline showing total disk access times for two sequential read commands A and B directed to a particular SSD drive 605. For illustrative purposes, the storage commands 110 will be described as read commands, however it should be understood that the storage commands could include any combination of write and/or read commands. The first read command A has a total disk access time 20 that includes storage processor overhead 21, physical disk access 30, and storage processor overhead 22.

Storage processor overhead 21 may comprise the time required for storage processor 200 to process the received read command A and send the read command A to SSD drive 605. Physical disk access 30 may comprise the amount of time required by the SSD drive 605 to process the read command A and supply the associated data back to storage processor 200. Storage processor overhead stage 22 may comprise the time required by storage processor 200 to then process the data received back from SSD drive 605 and return the data back to initiator 100.

A second read command B has a total disk access time 40 including storage processor overhead 41, physical disk access 50, and storage processor overhead 42 similar to the storage processor overhead 21, physical disk access 30, and storage processor overhead 22 for read command A, respectively.

As shown in FIG. 3, read commands A and B are conducted serially and there is a substantial amount of time when SSD drive 605 is idle. For example, SSD drive 605 may be idle during storage processor overhead times 21, 22, 41, 42, and during any additional time period after sending the results for read command A and waiting to receive the next read command B.

Figure 4:
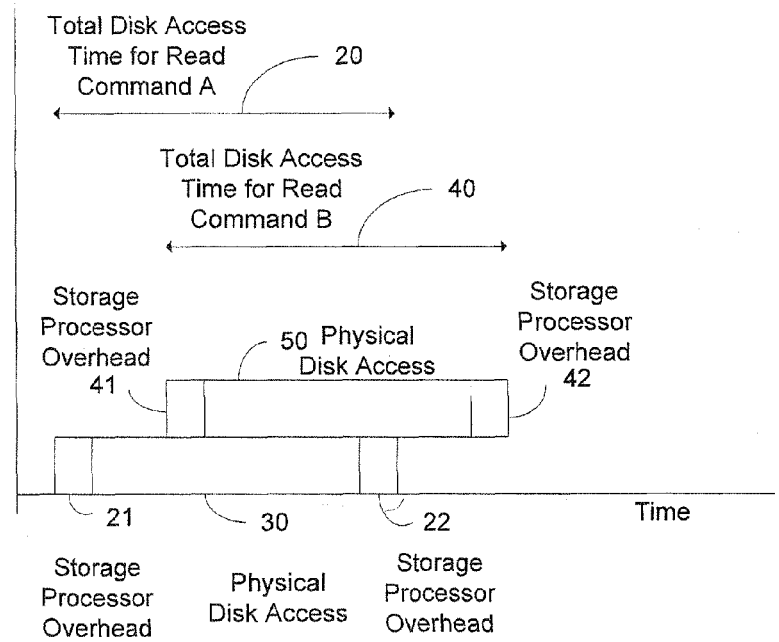
FIG. 4 depicts an example of parallel read commands to a disk drive.

FIG. 4 shows how read commands A and B may be serviced concurrently, e.g., in parallel, to increase utilization of SSD drive 605. The two read commands A and B are overlapped in time either by the command queue 300 in storage processor 200 and/or drive queue 620 in SSD drive 605. Overhead stages 21 and 41 for read commands A and B, respectively, may only be processed serially by the storage processor 200 and therefore are not overlapped in time. Similarly, overhead stages 22 and 42 for read commands A and B, respectively, may represent commands that can only be processed serially by the storage processor 200 and therefore may not be overlapped in time.

After the initial storage processor overhead 21 and during the physical disk access 30 in SSD drive 605 for read command A, the storage processor 200 may complete storage processor overhead 41 and send read command B to SSD drive 605 to begin physical disk access 50. For a period of time physical disk access 30 and physical disk access 50 are performed concurrently. For example, read command B may access a first memory device 630 in the SSD drive 605 while read command A is accessing a second memory device 630 in the same SSD drive 605.

Physical disk access 30 and storage processor overhead 22 may complete for read command A during the physical disk access 50 for read command B. The physical disk access 50 and the storage processor overhead 42 may then complete for read command B.

The overall time for completing the two read commands A and B is substantially less than the two serial read commands A and B in FIG. 3 since SSD drive 605 does not have to wait for the second read command B and at least a portion of the two physical disk accesses 30 and 50 may be conducted in parallel. This reduction in overall time occurs solely due to parallelism and does not reduce the completion time of individual read commands A and B.

Figure 5:
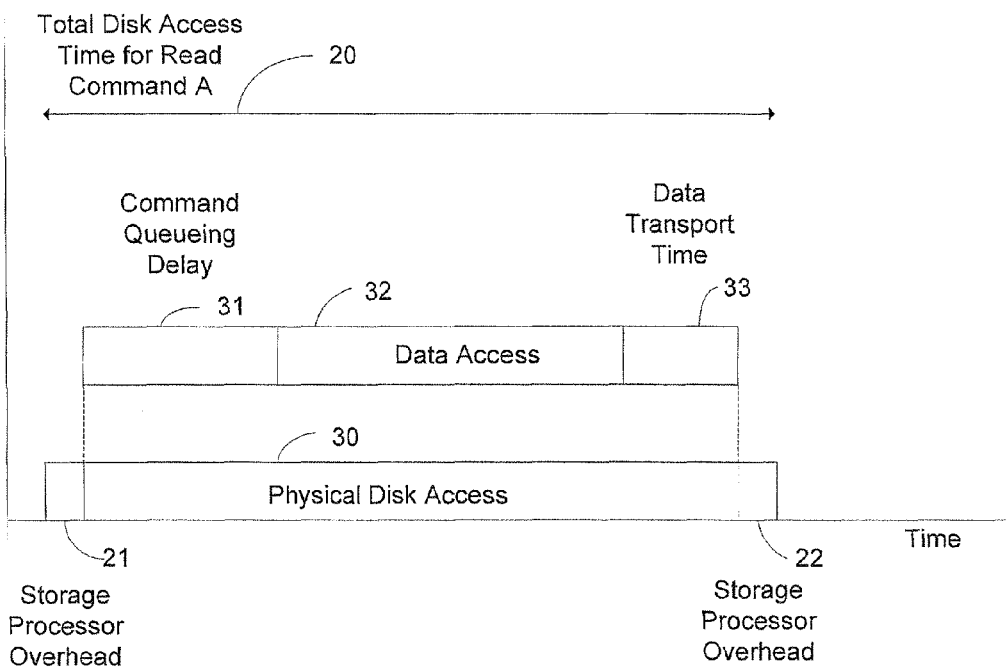
FIG. 5 depicts an example of different processing stages of the disk drive during a physical disk access.

FIG. 5 shows different stages of the physical disk access 30 for read command A in more detail. The physical disk access 50 for read command B has similar stages. The physical disk access 30 in SSD drive 605 may include command queuing 31, data access 32, and data transport 33. For write commands 110, the data transport 33 may come after command queuing 31 and before data access 32.

Command queuing 31 is associated with the SSD drive 605 waiting to access one of the memory devices 630 in FIG. 2. For example, drive controller 610 in FIG. 2 may receive read command A from storage processor 200 in drive queue 620 and then wait during command queuing 31 for the memory devices 630 associated with the read command 100 to become available.

For a read command 110, data access 32 is associated with the time required for the memory devices 630 in SSD drive 605 to access and supply the data for the read command A back to drive queue 620. For a write command 110, data access 32 is associated with the time required to write the data from drive queue 620 into memory devices 630 after the memory devices 630 become available.

For a read command A directed to target 400, data transport 33 is associated with the time required to send data from the SSD drive 605 in disk drives 500 back to the storage processor 200 over connection 12B in FIG. 2. For a read command A directed to disk drives 600, data transport 33 is associated with the time required to send data from the SSD drive 605 in disk drives 600 back to the storage processor 200 over connection 310 in FIG. 2.

For a write command 110 to target 400, the data transport 33 may be associated the time required to send data from command queue 300 over connection 12B to one of the SSD drives 605 in disk drives 500. For a write command 110 to disk drives 600, the data transport 33 may be associated the time required to send data from command queue 300 over connection 310 to one of the SSD drives 605 in disk drives 600.

Figure 6:
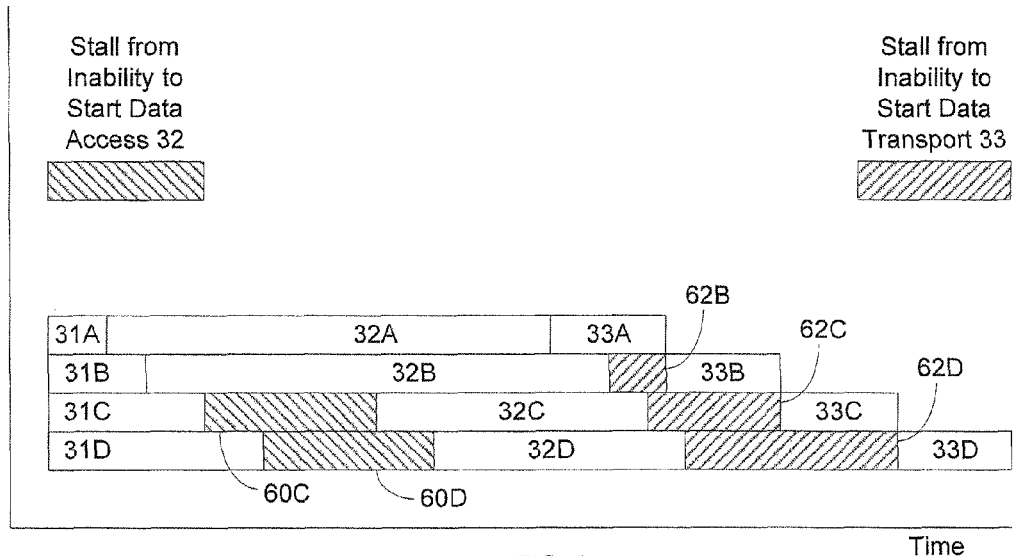
FIG. 6 depicts an example of stalling in the disk drive while processing concurrent read commands.

FIG. 6 depicts an example of a timeline showing multiple read commands A-D initiated concurrently in one of the SSD drives 605. The four read commands A-D all may initially reside in the drive queue 620 of SSD drive 605 in FIG. 2. Command queuing delays 31A-31D represent the time read commands A-D, respectively, wait in the drive queue 620 before being sent to the memory devices 630.

Two stalls 60C and 60D are shown associated with read commands C and D, respectively. Stalls 60C and 60D represent the drive controller 610 in FIG. 2 ready to initiate read commands C and D, respectively, but the associated memory devices 630 delaying acceptance of the read commands while servicing other read commands. In other words, stalls 60C and 60D may be associated with collisions in SSD drive 605 caused by multiple read commands trying to access the same memory devices 630 at the same time.

At least a portion of the data accesses 32A-32D overlap. The data access 32A for read command A completes first and starts data transport 33A. For example, the data associated with read command A may be received back in drive queue 620 and the drive controller 610 may send the data to a data queue (not shown) or command queue 300 in storage processor 200 over connection 310 or 12B.

Three data transport stalls 62B, 62C, and 62D are shown after the completion of data accesses 32B, 32C, and 32D, respectively. The stalls 62B, 62C, and 62D represent the drive controller 610 receiving the data back from memory devices 630 for read commands B, C, and D, respectively, and then waiting for other data to complete transport back to storage processor 200.

For example, drive controller 610 may initiate stall 62B for read command B while the data associated with read command A is being transported over connection 310 to command queue 300 during data transport 33A. Similarly, drive controller 610 may initiate stall 62C for read command C while the data for read commands A and B is being transported over connection 310 during data transport 33A and 33B, respectively. Drive controller 610 performs an even longer stall 60D during read command D waiting for completion of data transport 33B and 33C for read commands B and C, respectively.

FIG. 6 shows that the amount of time required to complete a read command in SSD drive 605 may vary depending on how long the drive controller 610 has to wait before accessing the memory devices 630 and how long the drive controller 610 has to wait to send data to the storage processor 200 over connection 310 or 12B. FIG. 6 also shows that the SSD drive may provide no additional performance benefit after some number of concurrent read commands. For example, the number of read commands that can be executed by the SSD drive 605 over some period of time may be limited by data transport times 33.

Figures 7, 8:
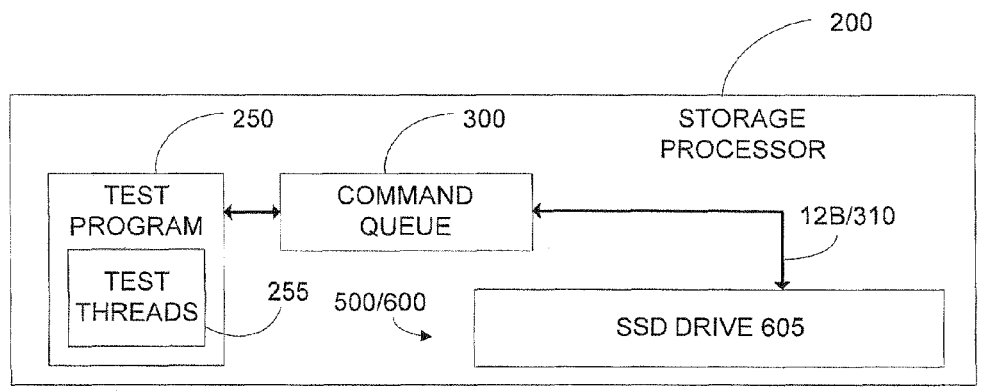
FIG. 7 depicts an example of a storage processor configured to determine average read latencies of a disk drive for different numbers of concurrent read operations.
FIG. 8 depicts an example of a performance table derived by the storage processor of FIG. 7.

FIG. 7 shows one example of how storage processor 200 may identify performance characteristics for one or more SSD drives 605. The same process described below can also be performed for any of the SSD drives 605 in disk drives 600 and/or disk drives 500 in target 400. A test program 250 may operate and initiate read commands from multiple test threads 255. In one example, the read commands may have random addresses of the same read size. However, any variety of different read and/or write commands may be used by test program 250.

Test program 250 uses different numbers of test threads 255 to launch different numbers of concurrent read commands to SSD drive 605. In another example, storage processor 200 may not use a test program 250, and may simply monitor read latency for actual read commands 110 received from initiator 100. For example, the storage processor 200 may receive read commands 110 from initiator 100 and issue the read commands 110 to the SSD drives 605. The storage processor 200 may then track the number of concurrent read commands issued to the different SSD drives 605 and the amount of time for data to be received back from the associated SSD drives 605.

Referring both to FIGS. 7 and 8, the test program 250 in one example may initiate one million (M) random read commands using different numbers of working test threads 255. Column 652 in table 650 indicates the number of working test threads 255 initiating concurrent read commands. For example, the second row in table 650 represents two test threads 255 issuing random read commands concurrently to a SSD drive 605 in disk drives 500 and/or 600. The fourth row in column 652 represents four test threads 255 issuing random read commands concurrently to SSD drive 605 in disk drives 500 and/or 600. Example numeric values provided in the subsequent description are for illustrative purposes and are not representative of an actual test result. Actual numeric values will vary depending on the performance of SSD drive 605 and the design of storage processor 200.

Column 654 indicates the time required to execute the 1M read commands. For example, a single test thread 255 may execute 1M random read commands in 100 seconds (secs) and two concurrent test threads 255 may execute 1M random read commands in 65 sec. The reduced time for two working threads may be attributable to the SSD drive 605 conducting parallel physical accesses to the memory devices 630 and not having to wait for each read command as previously shown in FIG. 4.

The times in column 654 continue to decrease as additional test threads 255 are used for increasing the number of concurrent read operations serviced by the SSD drive 605. In one example, SSD drive 605 may not be able to execute the 1M read commands in less than 30 secs, regardless of the number of working threads 255. As shown in FIG. 6, read commands may stall in drive queue 620 while other read commands access memory devices 630. Accordingly, sending more than seven concurrent read commands to SSD drive 605 may not reduce the time required to complete the 1M random read commands.

Column 656 indicates the total wait time for the threads 255. One working test thread 255 may wait 100 microseconds (usec) to receive back data for one read command. For example, the storage processor overhead times 21 and 22 as shown in FIGS. 3 and 4 may each be 25 usec and the physical disk access time 30 in SSD drive 605 may be 50 usec. Thus, the total time to execute a random read command with a single test thread 255 may be 25 usec+25 usec+50 usec=100 usec as indicated in the first row of column 658 and the total wait time for one thread to execute 1M random read commands may be 100 sec as indicated in the first row of column 656.

Moving down column 656, the total wait time for two concurrent working threads 255 is longer than the total wait time for one working thread 255. For example, the average read latency may be 50 usec (storage processor overhead 21/22 for first working thread)+50 usec (storage processor overhead 21/22 for second working thread)+50 usec (two parallel physical disk accesses)=150 usec. Thus, the total wait time for two threads for 1M random read commands is 150 sec as shown in the second row of column 656 and the average read latency for each thread is 150 usec as indicated in the second row of column 658.

Moving further down column 656, additional disk access delays may be experienced by the test threads 255 after some number of concurrent read commands. As previously shown in FIG. 6, SSD drive 605 may experience stalls 60 and 62 due to command queuing delays 31 and data transport delays 33, respectively. These additional delays are in additional to the storage processor overhead 21 and 22 shown in FIG. 5.

In one example, test threads 255 may experience additional disk access delays/stalling after four concurrent reads. Up until four working threads, each additional working thread 255 may generally only add 50 usec to the total wait time in column 658. For example, each additional working thread 255 may only increase latency due to the storage processor overhead 21 and 22.

With an additional fifth working thread 255, the total additional wait time increases by 83 usecs, compared with the previous 50 usec increase associated with storage processor overhead 21 and 22. The time to execute 1M random read commands with five working threads 255 is reduced from 40 secs to 35 secs in column 654. However, the total wait time for the five threads increases to 333 secs in column 656. Therefore, the average read latency as indicated in column 658 is 333 usec indicting that each thread would likely wait on average of 333 usec to receive back data from SSD drive 605.

Figure 9:
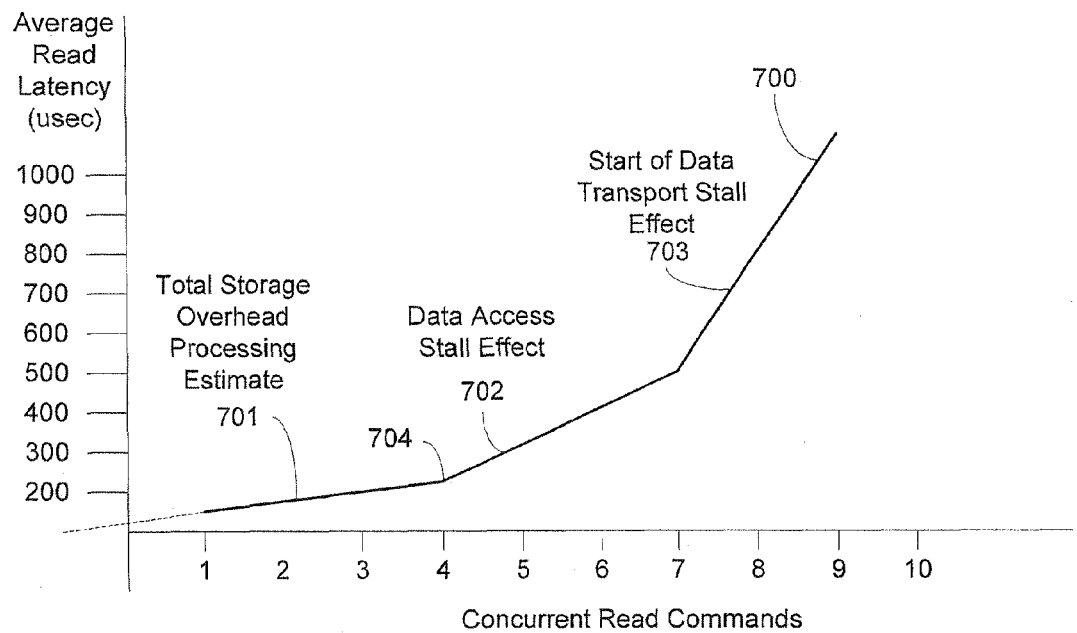
FIG. 9 depicts an example of a graph showing a performance curve derived from the performance table in FIG. 8.

FIG. 9 is a graph showing a performance curve or performance pattern for the data monitored in table 650 of FIG. 8. The horizontal axis indicates a number of concurrent read commands 110 submitted to the SSD drive 605 and the vertical axis indicates an average read latency in microseconds (usec) per read command. For example, the horizontal axis corresponds with the number of active working threads shown in column 652 in FIG. 8 and the vertical axis corresponds with the average read latency as shown in column 658 in FIG. 8.

The performance curve 700 identifies the characteristics of a particular SSD drive 605 for different numbers of concurrent read commands. The shape of curve 700 may vary depending on the size, speed, number of memory devices 630, the structure of the drive controller 610, how data is striped across the memory devices 630, the size of the drive queue 620, data transport times to and from the SSD drive, overhead processing times, or the like, or any combination thereof.

Section 701 of curve 700 corresponds with the average read latency for 1-4 concurrent read commands. As explained above in FIG. 8, four read commands may be conducted in parallel with relatively little additional read latency. Each additional concurrent read command in section 701 may only increase the average read latency by some amount attributable to storage processor overhead 21 and 22 as shown in FIGS. 3 and 4.

Section 702 of curve 700 identifies the average read latency for 4-7 concurrent read operations. Section 702 has a steeper slope than section 701 that may be attributable to the additional stalling 60 and 62 in FIG. 6 when the SSD drive 605 services additional concurrent read commands. As previously shown in FIG. 6, additional stalling 60 may be due to the drive controller 610 waiting to access memory devices 630 currently servicing other storage commands. Other stalling 62 may happen while the drive controller 610 in SSD drive 605 waits to send data back to the storage processor 200 over connection 310 or connection 12B. Section 703 of curve 700 identifies the average read latency for 8-10 concurrent read commands Section 703 has a steeper slope than section 701 or 702 indicating further read latency in the SSD drive 605 caused by additional concurrent read commands.

There is substantially little queuing penalty in section 701 of curve 700 since most read commands may be processed quickly and the only added latency is from storage processor overhead. However, the SSD drive 605 may be under utilized in section 701 since additional concurrent operations could increase the total number of storage commands that could be performed in a particular time period. Section 702 indicates some latency penalty for additional concurrent queuing in the SSD drive 605. However, the additional queuing may also improve overall utilization of the SSD drive 605 since more storage commands may be completed within a given period of time.

Section 703 indicates queuing more than seven read commands provides no improvement in overall performance of the SSD drive 605 and also substantially increases the average read latency. For example, every additional concurrent read command in section 703 is likely to collide with other read commands currently being serviced by memory devices 630. Further, every additional concurrent read command is also likely to stall while data for other read commands is transmitted back to the storage processor 200. Thus, operating in section 703 may reduce overall performance of SSD drive 605 since the read latency may be substantially increased without any additional increase the number of executed storage operations.

In one example, good performance of SSD drive 605 may be associated with location 704 in curve 700 where section 701 ends and section 702 starts. Location 704 may indicate a level of queuing that provides good utilization of SSD drive 605 without adding unnecessary read latency due to command queuing delay 31 or data transport delay 33.

Thus, a desired number of concurrent read commands for SSD drive 605 may be in some general area around location 704. In other words, the area around location 704 is associated with adequate utilization of SSD drive 605 while also maintaining a relatively low read latency.

The desired operating location in curve 700 may vary depending on the slope of sections 701, 702, and 703. For example, less slope in section 702 may indicate less read latency delay due to collisions in SSD drive 605. Accordingly, the target number of concurrent read commands may be selected higher up in section 702. Alternatively, when the slope of sections 701 and 702 are steeper, the target number of concurrent read commands may be selected in a upper location of section 701 or a lower location in section 702.

Figure 10:
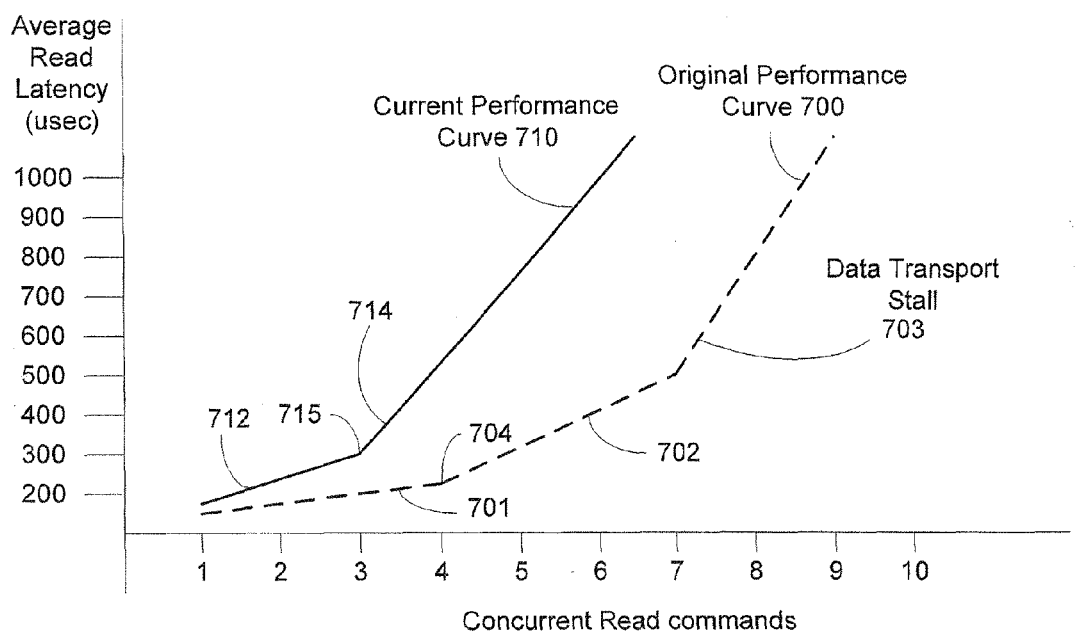
FIG. 10 depicts an example of a graph showing how the performance curve in FIG. 9 may change over time.

FIG. 10 depicts one example of how the performance of SSD drive 605 may change over time. The SSD drive 605 may use an indirection table to access memory devices 630. Over time portions of data associated with storage access commands may be spread over a larger number of the memory devices 630. The disjointed data may either reduce the number of concurrent read commands performed by SSD drive 605 or may increase the amount of time for the SSD drive 605 to reassemble the data. Thus, read latency for SSD device 605 may vary based on the state of the indirection table, how data is spread across the memory devices 630, and the amount of time required to reassemble the data spread over the different memory devices 630.

FIG. 10 shows one example of how SSD drive 605 changes from performance curve 700 to performance curve 710. Performance curve 710 may be derived by storage processor 200 at some later time in a similar manner as described above in FIGS. 7 and 8. A first section 712 of performance curve 710 is associated with 1-3 concurrent read commands and has a steeper slope than section 701 of curve 700. A second section 714 of curve 710 is associated with more than three concurrent read commands and has a steeper slope than section 702 of curve 700.

Performance curve 710 shows that more than three concurrent read commands substantially increase the average read latency of SSD drive 605. For example, due to striping of data across the memory devices 630, SSD drive 605 may not be able to efficiently service more than three concurrent read commands.

Storage processor 200 may dynamically adjust the number of storage commands queued in SSD drive 605 to correspond with the updated performance curve 710. For example, storage processor 200 may change from queuing no more than five read commands in the SSD drive 605 to queuing no more than three read commands in SSD drive 605. Basing drive queuing on performance curves 700 and 710 maintains high drive utilization and low read latency even when the SSD drive 605 changes operating characteristics.

Figure 11:
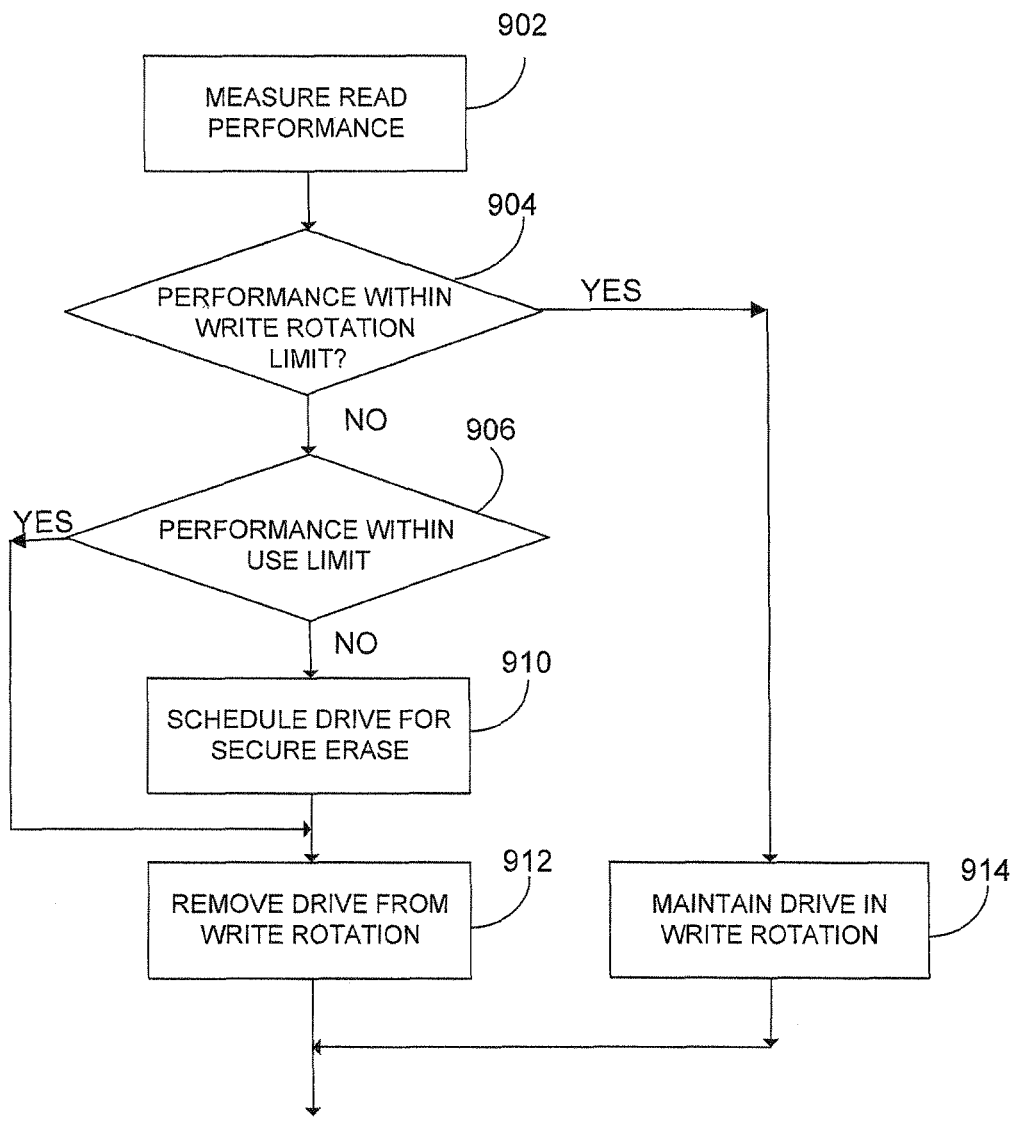
FIG. 11 depicts an example of a process for accessing a disk drive according to disk drive read performance.

FIG. 11 shows an example of how the performance curves for the SSD drives 605 may be used by storage processor 200. The performance curves 700 and 710 may serve as a predictor of SSD drive performance for different numbers of concurrent storage accesses. In operation 902, storage processor 200 may measure the read performance for a particular SSD drive 605. In one example, storage processor 200 may operate the test routine described above in FIGS. 7 and 8 to determine the read latency for one or more concurrent read commands. In another example, storage processor 200 may forward one or more read commands 110 from initiator 100 to SSD drive 605 and record the read latencies for SSD drive 605.

In operation 904, storage processor 200 determines if the measured read latency is within a write rotation limit. For example, the write rotation limit may be based on the performance curve 700 in FIG. 10 and in one example, may be identified as 300 usecs. When the measured read performance in operation 902 has a read latency of 300 usecs or less, SSD drive 605 is maintained in a write rotation in operation 914. For example, the storage processor 200 will continue to write data to SSD drive 605 and read data from the SSD drive 605.

Storage processor 200 in operation 906 may determines if SSD drive 605 is performing within a second use limit, when SSD drive 605 is not operating within the write rotation limit in operation 904. For example, based on performance curve 700 or 710 in FIG. 10, storage processor 2000 may identify a use limit of 900 usecs. The use limit may represent a condition where SSD drive 605 can no longer be used due to an unacceptably long average read latency.

When the average read latency is within the use limit in operation 906, storage processor 200 may remove the SSD drive 605 from write rotation in operation 912 but continue to read data from the SSD drive 605. For example, to stop additional fragmentation of data across the different memory devices 630, storage processor 200 may stop writing new data into SSD drive 605.

When the measured read performance is not within the use limit in operation 906, storage processor 200 may schedule SSD drive 605 for a secure erase in operation 910. For example, the indirection table in SSD drive 605 may be invalidated effectively erasing all of the data. The SSD drive 605 is then removed from write rotation in operation 912.

After completing the secure erase, storage processor 200 may start writing data back into the SSD drive 605 and return to operation 902. In one example, the SSD drive 605 is located in disk drives 600 and used as a cache or tiering media. Storage processor 200 may erase the SSD drive 605 and reload new data from disk drives 500 in target 400. In another example, SSD drive 605 is located in disk drives 500 of target 400. Storage processor 200 may read data from the SSD drive 605 in disk drives 500, schedule the secure erase operation 910, and then rewrite the reassemble data back into the SSD drive 605 of disk drives 500.

Figure 12:
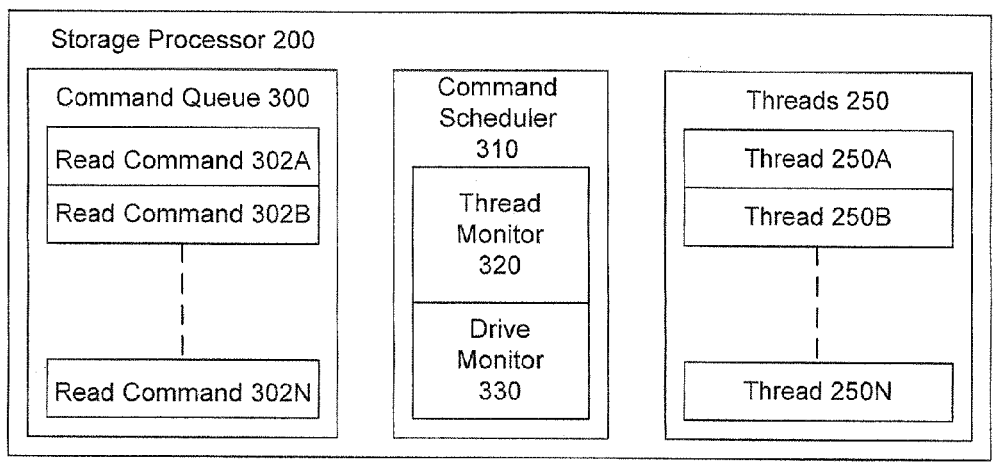
FIG. 12 depicts an example of a storage processor configured to assign read commands to threads.

FIG. 12 depicts an example of storage processor 200 in more detail. Command queue 300, threads 250, and a command scheduler 310 comprise logic circuitry, software, buffers, memory, registers, or the like, or any combination thereof used by the storage processor 200 for performing the operations described below. Command queue 300 buffers read and/or write commands 302 received from initiator 100. In this example, command queue 300 contains read commands 302A-302N. Read commands 302 may include an identifier associated with the initiator 100 and an address associated with data contained in the disk drives 600 and/or 500.

In one example, threads 250 may be controlled and parallelized via operating system software that operates command scheduler software 310. Multi-threaded processors and multi-threaded operating systems are known to those skilled in the art and are therefore not described in further detail.

Command scheduler 310 may control which read commands 302 are assigned to threads 250, when read commands 302 are assigned to the threads 250, and in what order read commands 302 are assigned to threads 250. Threads 250 use the address associated with the assigned read commands 302 to identify the SSD drive 605 for servicing the read command.

Command scheduler 310 may use any variety of schemes for assigning read commands 302 to threads 250. For example, command scheduler 310 may issue the read commands to the threads 250 on a round robin basis where each read command 302 in command queue 300 is assigned to a next one of threads 250. In another example, the command scheduler 310 may use a scheme that prevents head of line blocking. For example, thread 250A may currently be servicing four currently pending read commands 302 all directed to the same SSD drive 605A in FIG. 2.

A next read command 302A in command queue 300 may be directed to the same SSD drive 605A. Command scheduler 310 may defer assigning the read command 302A to one of the threads 250 and assign the next read command 302B to a next thread 250B. In this example, read command 302B is directed to a different SSD drive 605B not currently servicing any pending read commands 302. Thread 250B can then immediately service read command 302B with SSD drive 605B instead of waiting for thread 250A to finish the four currently pending read commands on SSD drive 605A.

Command scheduler 310 may monitor threads 250 to determine their current workload and monitor the different SSD drives 605 to determine their current workload. Command scheduler 310 may then assign the read commands 302 to threads 250 according to the monitored workloads and predicted read latency.

Figure 13:
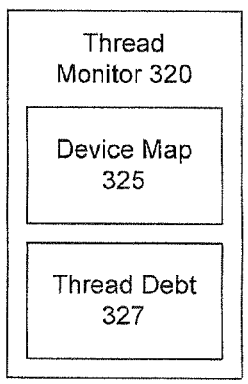
FIG. 13 depicts an example of a thread monitor used in the command scheduler of FIG. 12.
Figure 14:
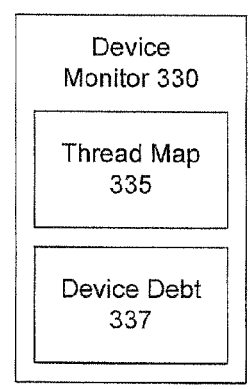
FIG. 14 depicts an example of a device monitor used in the command scheduler of FIG. 12.

FIG. 13 depicts an example of a thread monitor 320 operated by command scheduler 310 and FIG. 14 depicts an example of a device monitor 330 operated by command scheduler 310. Thread monitor 320 includes a device map 325 that identifies SSD drives 605 currently used by a particular thread 250 for servicing read commands 302. Device map 325 may be a bit map or other data structure that identifies the SSD drives 605. For example, thread monitor 320 may identify each SSD drive 605 accessed by a particular thread 250A and list the identified SSD drives 605 in the device map 325 associated with that particular thread 250A.

A thread map 335 in device monitor 330 may be a bit map or other data structure that identifies the threads 250 accessing a particular SSD drive 605. Device monitor 330 may identify each thread 302 accessing a particular SSD drive 605 and list the identified threads in thread map 335.

Device map 325 and thread map 335 may be updated whenever a read command 302 is assigned to a particular thread 250. For example, command scheduler 310 may assign a particular read command 302 to a particular thread 250. The thread monitor 320 may identify the SSD drive 605 associated with the read command address and update the device map 325 for the assigned thread 250 with the identified SSD drive 605. Device monitor 330 may similarly update the thread map 335 for the identified SSD drive 605 with the assigned thread 250.

Whenever a read command 302 is completed by a particular thread 250 on a particular SSD drive 605, thread monitor 320 may remove the particular SSD drive 605 from the device map 325 for the associated thread 250 and the device monitor 330 may remove the particular thread 250 from the thread map 335 for the associated SSD drive 605.

Thread monitor 320 may also track a thread debt value 327 corresponding to an amount of processing debt/delay for the associated thread 250 and device monitor 330 may also track a device debt value 337 corresponding to an amount of processing debt/delay for the associated SSD drive 605. Examples of how the thread debt value 327 and device debt value 337 are derived for a particular thread 250 and SSD drive 605, respectively, are explained in more detail below.

Figure 15:
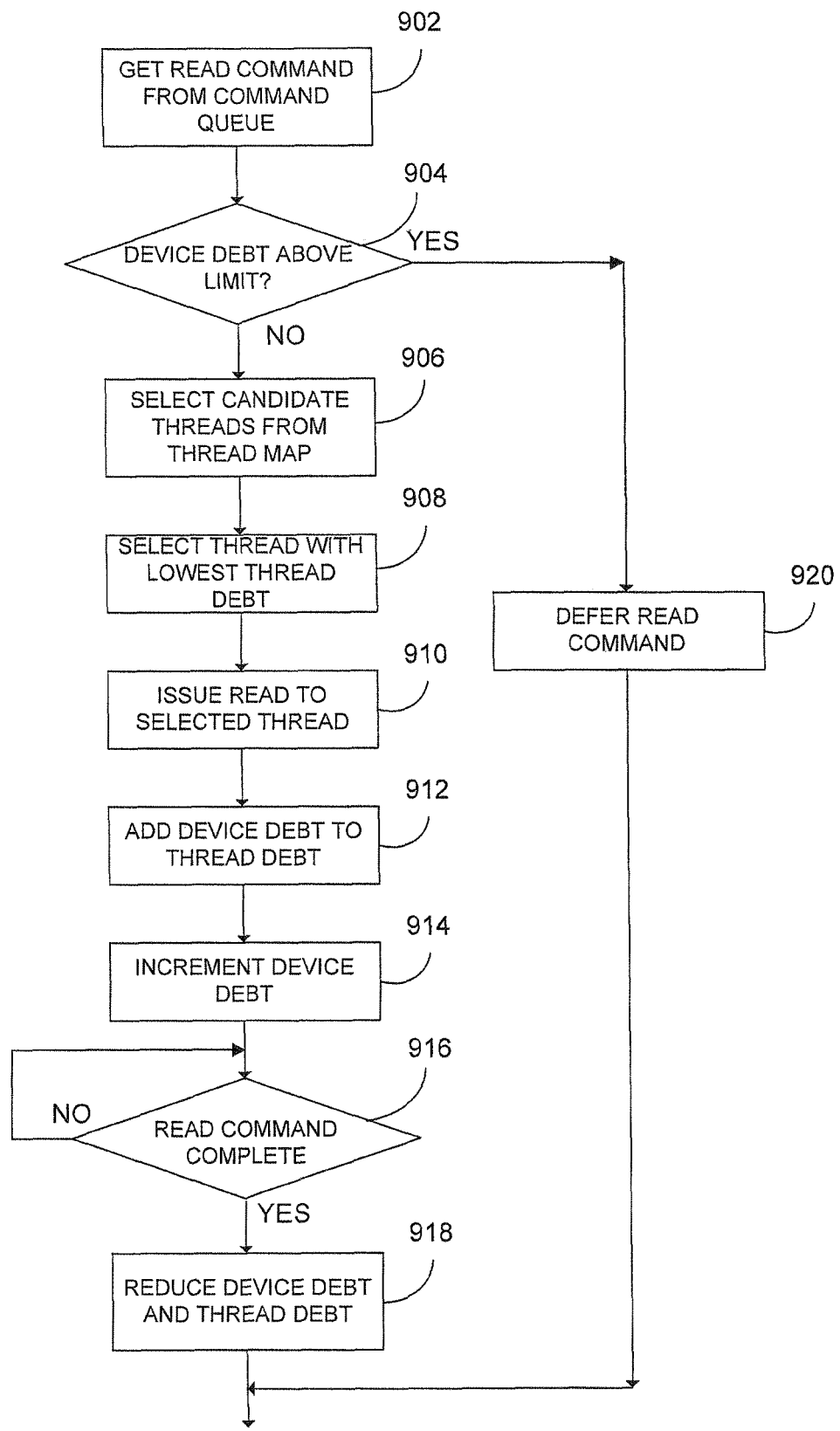
FIG. 15 depicts an example of a process for assigning read commands to threads according to device debt and thread debt.

FIG. 15 depicts an example of a process for operating a command scheduler. In one example, the command scheduler may try and assign as many read commands 302 as possible to threads 250 as long as the predicted latency for the assigned read commands is relatively low. In one example, the command scheduler may try and prevent assigning read commands 302 that would likely stall subsequent read commands 302 based on the thread debt value 327 for the candidate thread 250 or the device debt value 337 for the associated SSD drive 605.

The command scheduler in operation 902 receives a read command 302 from command queue 300 and identifies the device debt value 337 for the associated SSD drive 605 in operation 904. For example, the command scheduler identifies the SSD drive 605 associated with the address in the read command 302 and identifies the device debt value 337 associated with the identified SSD drive 605.

The device debt value 337 is compared with a limit value in operation 904. The limit value may be identified based on the dynamically changing performance curves 700 and/or 710 associated with the identified SSD drive 605. As explained above, the command scheduler may be configured to identify the location 704 in FIG. 10 where section 701 of curve 700 ends and section 702 begins. The limit value in operation 904 may be selected as a certain number of concurrent reads around location 704. For example, location 704 may be associated with four concurrent read commands. The command scheduler may be configured to set the limit value in operation 904 to two concurrent reads above location 704, e.g., six concurrent reads.

As shown in FIG. 10, the performance of the SSD drive may change over time from performance curve 700 to performance curve 710. Location 715 in curve 710 corresponds with three concurrent read commands and identifies the beginning of section 714. Section 714 of curve 710 has a high slope and an associated high average read latency. Thus, the command scheduler may not issue more than three concurrent read commands when the SSD drive 605 is operating according to performance curve 710.

The command scheduler may be configured to change the limit value used in operation 904 to correspond with the dynamically changing performance curve for the SSD drive 605. For example, the command scheduler may change the limit value in operation 904 from the six concurrent reads corresponding with curve 700 to the three concurrent reads corresponding with curve 710.

When the device debt value 337 for the SSD drive 605 is above the limit value in operation 904, the command scheduler may defer the read command in operation 920. For example, the SSD drive 605 associated with the read command 302 may currently have seven pending read commands 302 and the device debt limit may be six. The command scheduler may skip over the read command 302 and process a next read command 302 in command queue 300 in operation 902.

The deferred read command 302 may be reevaluated in a round-robin manner after other read commands 302 in command queue 300 are processed. Other schemes can also be used, such as reevaluating the deferred read command after processing a certain number of other read commands, periodically reevaluating the deferred read command after a given time period, reevaluating the deferred read command when the device debt value 337 associated with the read command falls below a particular level, or the like, or any combination thereof. In another example, the command scheduler may assign the read command to a thread 250 after a certain time period has passed, regardless of the associated device debt value.

The command scheduler may issue the read command 302 to a thread 250 when the device debt value 337 is below the limit value in operation 904. The command scheduler in operation 906 may select a candidate thread based on the thread map 335 for the SSD drive 605 associated with the read command 302. For example, the command scheduler may identify one of threads 250 that is not currently accessing the associated SSD drive 605. In other words, command scheduler may identify one of the threads 250 not currently listed in the thread map 335 for the associated SSD drive 605. In another example, the candidate thread may need to be selected in operation 906 from one of the threads 250 already accessing the SSD drive.

In operation 908, the command scheduler may select one of the candidate threads 250 with a lowest thread debt value 327 and in operation 910 may issue the read command 302 to the selected thread 250.

The cost of assigning the read command 302 to a thread 250 may be proportional to the expected concurrency that that thread might encounter. In a first example, four read commands 302 may be assigned to a thread 250 and each of the four read commands 302 may be associated with a different SSD drive 605 that is currently processing only one other read command. The thread 250 is likely to complete the four read commands 302 quickly since there will likely be little stalling due to collisions with other read commands.

In a second example, four read commands 302 may be assigned to a thread 250 and each of the four read commands 302 may be associated with a different SSD drive 605 currently processing four other read commands. In this example, the thread 250 is likely to take substantially longer to complete the four read commands 320 due to the higher number of collisions and read latency on each of the four SSD drives 605.

The thread monitor may take into account the number of pending read commands on the associated SSD drives 605 in operation 912 by adding the device debt to the thread debt. In the first example, the four associated SSD drives only have one other pending read command 302. Thus, the thread debt value 327 for the assigned thread 250 may be incremented by four to account for four SSD drives each with a current device debt value 337 of one.

In the second example, each of the four SSD drives has four pending read commands 302. Thus, the thread debt value 327 for the assigned thread 250 may be increased in operation 912 by sixteen to account for the four SSD drives each having a device debt value 337 of four. An example of how to increase the thread debt value 327 in operation 912 is described in more detail in FIGS. 16 and 17.

In operation 914 the device monitor may increase the device debt value 337 for the SSD drive 605 associated with the issued read command. For example, the device monitor may increment the device debt value 337 for the associated SSD drive by one. An example, of how to increase the device debt value 337 in operation 914 is also described in more detail in FIGS. 16 and 17.

The device debt value 337 may also be scaled according to deviations between the predicted latency of the SSD drive 605 and the measured latency of the SSD drive 605. A last completed read command 302 for a particular SSD drive may have had a higher latency than the latency predicted in performance curve 700 in FIG. 10.

For example, the last read command 302 completed for a SSD drive 605 may have been the fifth concurrent read command for that particular SSD drive 605. Performance curve 700 may have predicted a read latency of 333 usec for the read command. However, the actual read latency may have been 500 usec.

Instead of increasing the device debt value 337 by one in operation 914, the command scheduler may further increase the device debt value 337 to correspond with the additional read latency likely to be associated with the SSD drive 605. This directed scaling of the device debt value 337 may provide immediate storage access optimization for the SSD drive when not operating according to the predicted performance curve 700. For example, the additional scaling of the device debt value 337 is likely to immediately reduce the number of concurrent reads assigned to the underperforming SSD drive.

The command scheduler monitors for completion of the read command 302 in operation 916. For example, the command scheduler may detect a signal from SSD drive 605 or detect when data associated with a particular read command 302 is received back in a data queue (not shown) in the storage processor 200. In operation 918, the device debt value 337 associated with the SSD drive 605 providing the data for the completed read command and the thread debt value 327 for the thread 250 servicing the completed read command are both reduced.

The device debt value 337 and/or thread debt value 327 may be reduced in a same manner as previously increased. For example, the device debt value 337 for the SSD drive providing data for the read command may be decremented by one and the thread debt value for the thread 250 servicing the read command may be reduced based on the device debt value of the SSD drive.

The command scheduler may also scale the reduction of the device debt value 337 and/or thread debt value 327 according to discrepancies between the actual measured read latency and the predicted read latency for the completed read command. For example, the thread debt value 327 and/or device debt value 337 may be reduced by a lesser amount when the measured read latency is greater than that predicted read latency associated with performance curve 700.

Figure 16:
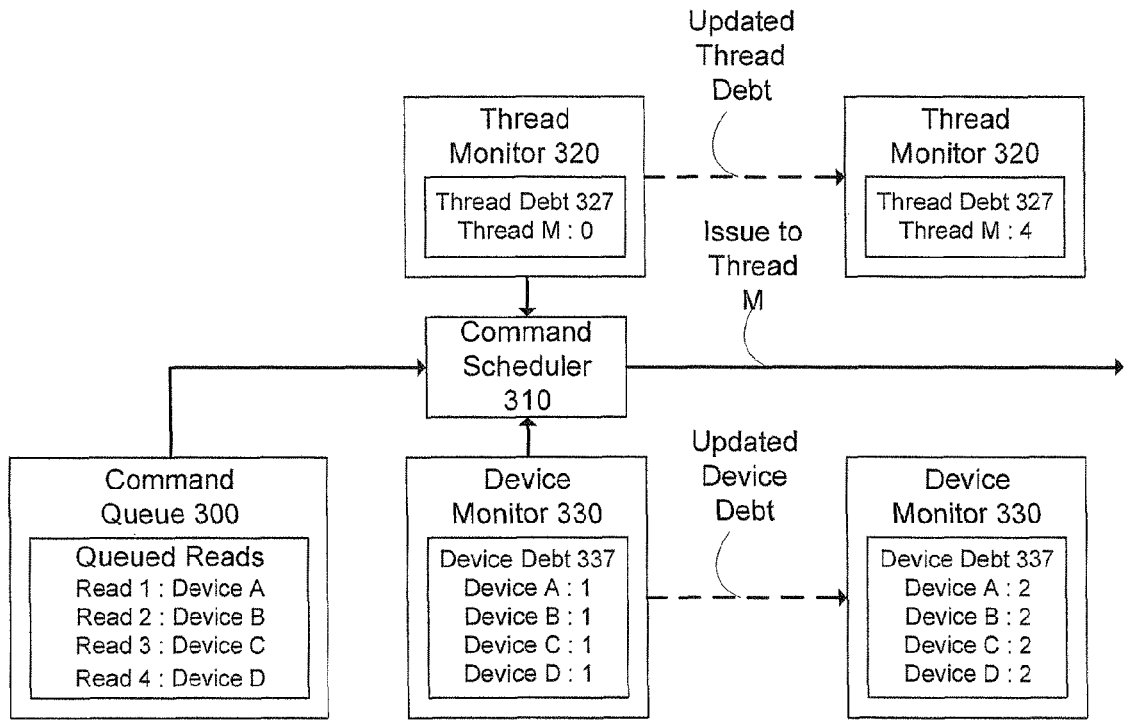
FIGS. 16 and 17 depict examples of how the storage processor derives the device debt and thread debt.
Figure 17:
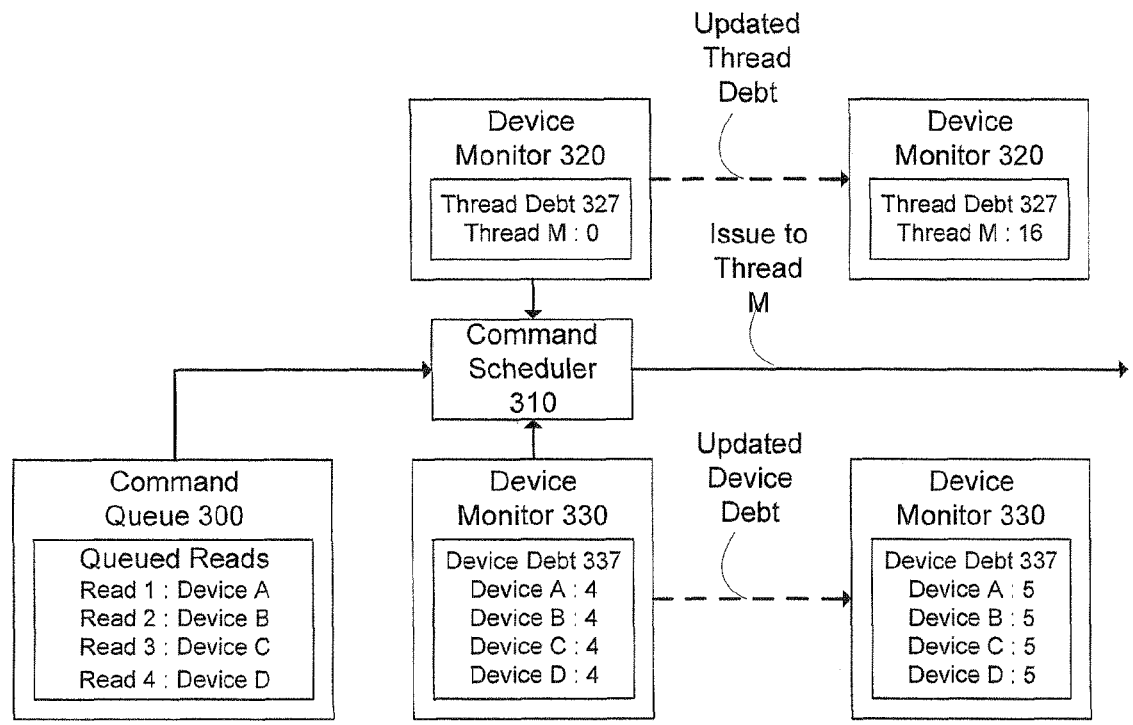

FIGS. 16 and 17 depict the two examples described above for increasing thread debt value 327 and device debt value 337. In FIG. 16 four read commands 1-4 are received in command queue 300 and are directed to four different SSD drives A-D, respectively. Command scheduler 310 assigns all four read commands 1-4 to a thread M that has a current thread debt value of zero. Each of the four SSD drives A-D currently has a device debt value of one that in one example may indicate each of the four SSD drives A-D is currently processing one read command.

Thread monitor 320 increases the thread debt value 327 for thread M to four reflecting the device debt value 337 of one for each of four memory devices A-D. Device monitor 330 increases each of the device debt values 337 from one to two for each of the four SSD drives A-D indicating each now has two pending read commands.

In FIG. 17 four read commands 1-4 are received in command queue 300 and are directed to four different SSD drives A-D, respectively. Command scheduler 310 assigns all four read commands 1-4 to thread M that has a current thread debt value 327 of zero. Each of the four SSD drives A-D currently has a device debt value 337 of four that in one example may indicate each of the four SSD drives A-D is currently servicing four read commands.

Thread monitor 320 increases the thread debt value 327 for thread M to sixteen to reflect the device debt value of four for each of four memory devices A-D. Device monitor 330 increases of the device debt values 337 from four to five indicating each of the four SSD drives A-D now has five pending read commands.

The thread debt values 327 and device debt values 337 may be reduced in a same manner when the corresponding read commands are completed. In the example of FIG. 16, thread monitor 320 may reduce the thread debt value for thread M by one when each of the read commands 1-4 is completed. In the example of FIG. 16, the thread monitor 320 may reduce the thread debt value for thread M by four when one of the read commands 1-4 in FIG. 17 is completed.

Thus, command scheduler 310 schedules the read commands 302 in an optimal operating range of the SSD drives that adequately utilizes the capacity of the SSD drives without unnecessarily increasing latency for individual storage access commands Hardware and Software Several examples have been described above with reference to the accompanying drawings. Various other examples are also possible and practical. The systems and methodologies may be implemented or applied in many different forms and should not be construed as being limited to the examples set forth above. Some systems described above may use dedicated processor systems, micro controllers, programmable logic devices, or microprocessors that perform some or all of the commands. Some of the commands described above may be implemented in software or firmware and other commands may be implemented in hardware.

For the sake of convenience, the commands are described as various interconnected functional blocks or distinct software modules. This is not necessary, however, and there may be cases where these functional blocks or modules are equivalently aggregated into a single logic device, program or command with unclear boundaries. In any event, the functional blocks and software modules or features of the flexible interface can be implemented by themselves, or in combination with other commands in either hardware or software.

Digital Processors, Software and Memory Nomenclature

As explained above, embodiments of this disclosure may be implemented in a digital computing system, for example a CPU or similar processor. More specifically, the term "digital computing system," can mean any system that includes at least one digital processor and associated memory, wherein the digital processor can execute instructions or "code" stored in that memory. (The memory may store data as well.)

A digital processor includes but is not limited to a microprocessor, multi-core processor, Digital Signal Processor (DSP), Graphics Processing Unit (GPU), processor array, network processor, etc. A digital processor (or many of them) may be embedded into an integrated circuit. In other arrangements, one or more processors may be deployed on a circuit board (motherboard, daughter board, rack blade, etc.). Embodiments of the present disclosure may be variously implemented in a variety of systems such as those just mentioned and others that may be developed in the future. In a presently preferred embodiment, the disclosed methods may be implemented in software stored in memory, further defined below.

Digital memory, further explained below, may be integrated together with a processor, for example Random Access Memory (RAM) or FLASH memory embedded in an integrated circuit Central Processing Unit (CPU), network processor or the like. In other examples, the memory comprises a physically separate device, such as an disk drive, storage array, or portable FLASH device. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such a conventional rotating disk drive. All such memories are "machine readable" in that they are readable by a compatible digital processor. Many interfaces and protocols for data transfers (data here includes software) between processors and memory are well known, standardized and documented elsewhere, so they are not enumerated here.

Storage of Computer Programs

As noted, some embodiments may be implemented or embodied in computer software (also known as a "computer program" or "code"; we use these terms interchangeably).

Programs, or code, are most useful when stored in a digital memory that can be read by one or more digital processors. The term "computer-readable storage medium" (or alternatively, "machine-readable storage medium") includes all of the foregoing types of memory, as well as new technologies that may arise in the future, as long as they are capable of storing digital information in the nature of a computer program or other data, at least temporarily, in such a manner that the stored information can be "read" by an appropriate digital processor. The term "computer-readable" is not intended to limit the phrase to the historical usage of "computer" to imply a complete mainframe, mini-computer, desktop or even laptop computer. Rather, the term refers to a storage medium readable by a digital processor or any digital computing system as broadly defined above.

Such media may be any available media that is locally and/or remotely accessible by a computer or processor, and it includes both volatile and non-volatile media, removable and non-removable media, embedded or discrete.

Having described and illustrated a particular example system, it should be apparent that other systems may be modified in arrangement and detail without departing from the principles described above. Claim is made to all modifications and variations coming within the spirit and scope of the following claims.

The invention claimed is:

1. An apparatus, comprising:
a memory;
a processor configured to issue the storage commands to the memory based on a number of concurrent storage commands being serviced by the memory and based on an expected latency associated with the number of concurrent storage commands;

identify a performance curve for the memory, wherein the performance curve maps the number of concurrent storage commands with the expected latency;
issue the storage commands to the memory based on the performance curve;
identify a first section of the performance curve associated with overhead processing;
identify a second section of the performance curve associated with stalling in the memory;
issue the storage commands to the memory based on the number of concurrent storage commands associated with the first and second section of the performance curve;
identify a first slope for the first section of the performance curve;
identify a second slope for the second section of the performance curve;
issue the storage commands to the memory based on the first slope and the second slope;
identify changes in the performance curve;
dynamically change the number of concurrent storage commands issued to in the memory based on the changes in the performance curve;
identify a write limit based on the performance curve, wherein the write limit is associated with writing data into the memory;
measure a latency for one of the storage commands;
compare the measured latency to the write limit;
discontinue writing data to the memory in response to the latency being outside of the write limit;
identify a use limit based on the performance curve, wherein the use limit is associated with reading data from the memory;
compare the latency to the use limit; and
erase data in the memory in response to the latency being outside of the use limit.

2. The apparatus of claim 1, wherein the processor is further configured to:
receive a new storage command;
determine a new number of concurrent storage commands serviced by the memory with the new storage command;
determine a new expected latency for the new number of concurrent storage commands; and
issue the new storage command to the memory based on the new expected latency.

3. The apparatus of claim 1, further comprising:
a command queue configured to receive the storage commands;
thread logic circuitry configured to issue the storage commands to the memory; and
a command scheduler configured to assign the storage commands to the threads based on the number of concurrent storage commands being serviced by the threads and the number of concurrent storage commands being serviced by the memory.

4. A method, comprising:
receiving a read operation;
identifying a memory device associated with the read operation;
identifying a latency of the memory device for servicing the read operation;
identifying a device debt for the memory device, wherein the device debt is associated with a number of read operations being processed by the memory device; and
tracking average latencies for different numbers of concurrent read operations issued to the memory device;
identifying patterns in the average latencies;
identifying a limit for the device debt based on the patterns;
identifying a predicted latency for the read operation based on the patterns;
measuring an actual latency of the read operation;
comparing the actual latency with the predicted latency;
increasing the device debt based on the comparison of the actual latency with the predicted latency;
deferring the issuing of the read operation to the memory device when the device debt is outside the limit; and
issuing the read operation to the memory device based on the identified latency.

5. The method of claim 4, further comprising:
identifying a thread debt, wherein the thread debt is based on the device debt of different memory devices accessed by a thread; and
assigning the read operation to the thread based on the thread debt.

6. The method of claim 5, further comprising increasing the device debt and increasing the thread debt in response to assigning the read operation to the thread.

7. The method of claim 5, further comprising reducing the device debt and reducing the thread debt in response to completion of the read operation.

8. The method of claim 4, further comprising:
selecting candidate threads from among multiple threads for issuing the read operation;
identifying thread debts for the candidate threads, wherein the thread debts are associated with a number of read operations being serviced by disk drives accessed by the candidate threads; and
assigning the read operation to one of the candidate threads based on the thread debts.

9. The method of claim 8, wherein selecting the candidate threads comprises:
maintaining thread maps for the disk drives, wherein the thread maps identify which of the threads are accessing the disk drives;
identifying one of the disk drives associated with the read operation; and
identifying the threads not listed in the thread map for the identified one of the disk drives as the candidate threads.

10. A storage processor, comprising:
a command queue configured to:
receive storage commands; and
maintain threads configured to initiate the storage commands to memory devices;
a command scheduler configured to:
identify device debts for the memory devices, wherein the device debts are associated with a number of storage operations pending in the memory devices, the command scheduler further configured to assign the storage commands to the threads based on the device debts;
the storage processor further comprising logic circuitry configured to:
identify latency patterns for the memory devices for different numbers of concurrent storage operations;
identify latency limits for the memory devices based on the latency patterns;
measure storage access latencies for the memory devices; and
erase the memo devices when the storage access latencies for the memory devices are outside the latency limits for the memory devices.

11. The storage processor of claim 10, further comprising thread maps associated with the memory devices, wherein the thread maps identify which threads are accessing the memory devices.

12. The storage processor of claim 10, wherein the command scheduler is further configured to:
   identify thread debts for the threads, wherein the thread debts are associated with the device debts of the memory devices accessed by the threads; and
   assign the storage commands to the threads based on the thread debts.

13. The storage processor of claim 12, further comprising device maps associated with the threads, wherein the device maps identify which memory devices are being accessed by the threads.

14. The storage processor of claim 10, further comprising logic circuitry configured to:
   measure latencies of the memory devices for different numbers of concurrent storage operations; and
   identify concurrent storage access limits for the memory devices based on the latencies,
   wherein the command scheduler is configured to assign the storage commands to the threads when the device debts for the memory devices accessed by the threads are within the concurrent storage access limits for the memory devices.

15. The storage processor of claim 10, wherein the command scheduler is configured to defer assigning the storage commands to the threads when the devices debts for the memory devices associated with the storage commands are outside of the concurrent storage access limits for the memory devices.

16. The storage processor of claim 10, wherein the command scheduler is configured to:
   identify predicted storage access latencies for the memory devices associated with the storage commands based on the device debts for the associated memory devices; and
   assign the storage commands to the threads based on the predicted storage access latencies.

17. The storage processor of claim 16, wherein the command scheduler is further configured to:
   measure actual storage access latencies of the memory devices;
   receive new storage commands;
   assign the new storage commands to the threads; and
   increase the device debts for the memory devices accessed by the new storage commands based on the predicted storage access latencies and the actual storage access latencies.

18. The storage processor of claim 10, wherein a first set of the memory devices are associated with targets addressed by the storage commands and a second set of the memory drives are configured to operate as a tiering or cache media and store copies of at least some of the data in the first set of memory devices.

19. The storage processor of claim 10 wherein the memory devices comprise solid state drives (SSDs) comprising multiple separately accessible memory elements configured to be accessed by multiple storage commands at the same time.

20. A storage processor, comprising:
   a command queue configured to:
      receive storage commands; and
      maintain threads configured to initiate the storage commands to memory devices; and
   a command scheduler configured to:
      identify device debts for the memory devices, wherein the device debts are associated with a number of storage operations pending in the memory devices, the command scheduler further configured to assign the storage commands to the threads based on the device debts;
      measure latencies of the memory devices for different numbers of concurrent storage operations; and
      identify concurrent storage access limits for the memory devices based on the latencies,
      wherein the command scheduler is configured to assign the storage commands to the threads when the device debts for the memory devices accessed by the threads are within the concurrent storage access limits for the memory devices; and, to defer assigning the storage commands to the threads when the devices debts for the memory devices associated with the storage commands are outside of the concurrent storage access limits for the memory devices.

21. A storage processor, comprising:
   a command queue configured to:
      receive storage commands; and
   maintain threads configured to initiate the storage commands to memory devices;
   a command scheduler configured to:
      identify device debts for the memory devices, wherein the device debts are associated with a number of storage operations pending in the memory devices, the command scheduler further configured to assign the storage commands to the threads based on the device debts;
      identify predicted storage access latencies for the memory devices associated with the storage commands based on the device debts for the associated memory devices; and
      assign the storage commands to the threads based on the predicted storage access latencies;
      measure actual storage access latencies of the memory devices;
      receive new storage commands;
      assign the new storage commands to the threads; and
      increase the device debts for the memory devices accessed by the new storage commands based on the predicted storage access latencies and the actual storage access latencies.

\* \* \* \* \*